Oct. 20, 1953  R. D. FILSINGER ET AL  2,656,034
VEHICLE HAULING ELEVATOR
Filed Jan. 14, 1952  4 Sheets-Sheet 1
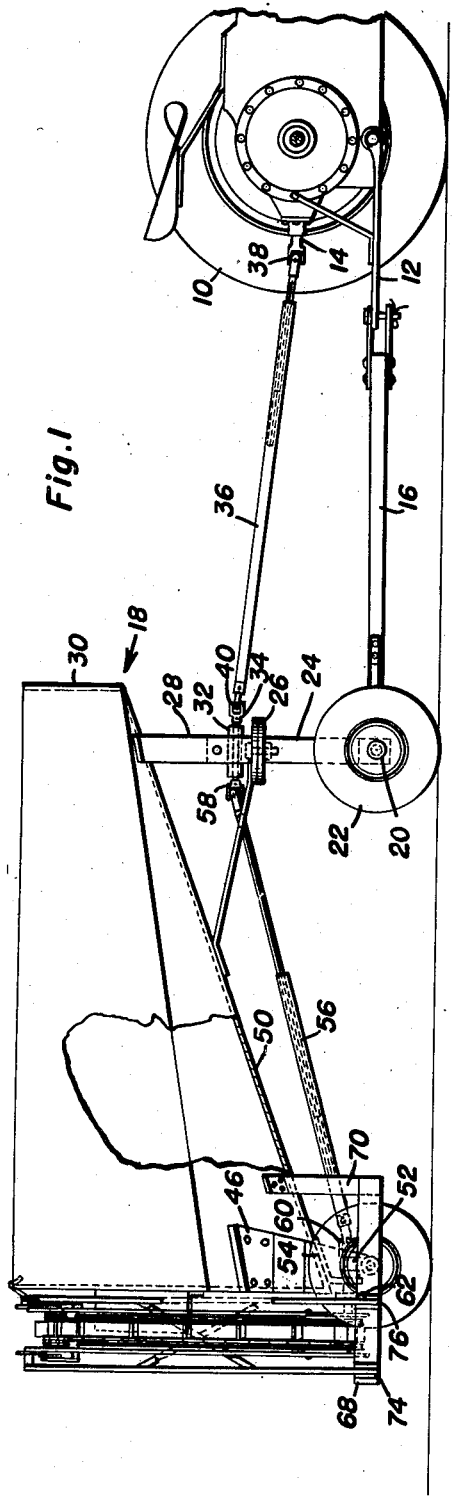
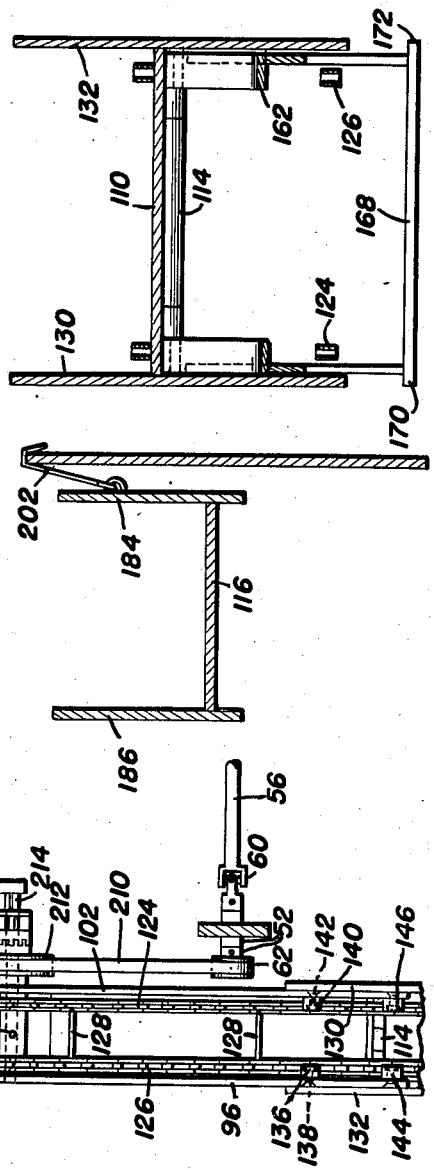
Raymond D. Filsinger
Dean L. Filsinger
INVENTORS.
BY *Clarence A. O'Brien*
*and Harvey B. Jackson*
Attorneys Oct. 20, 1953 R. D. FILSINGER ET AL 2,656,034
VEHICLE HAULING ELEVATOR
Filed Jan. 14, 1952 4 Sheets-Sheet 2
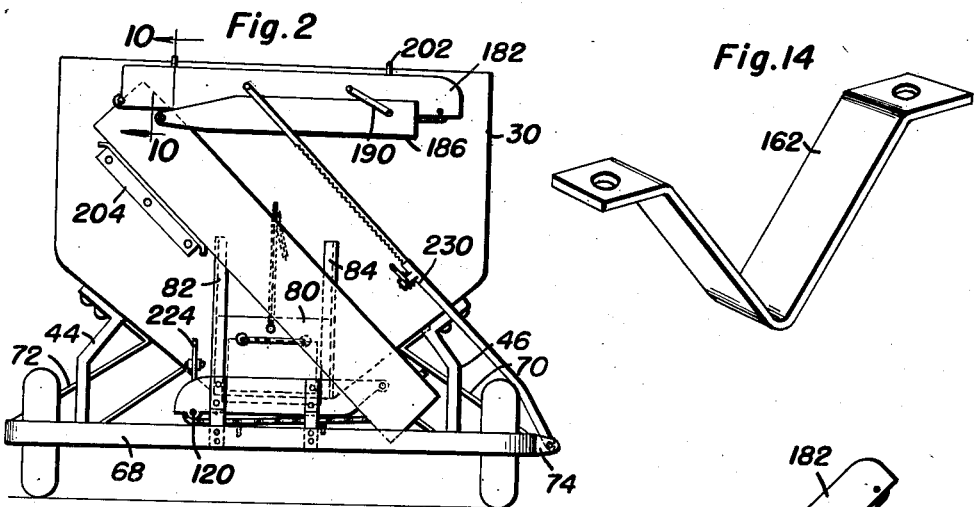
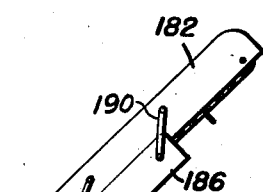
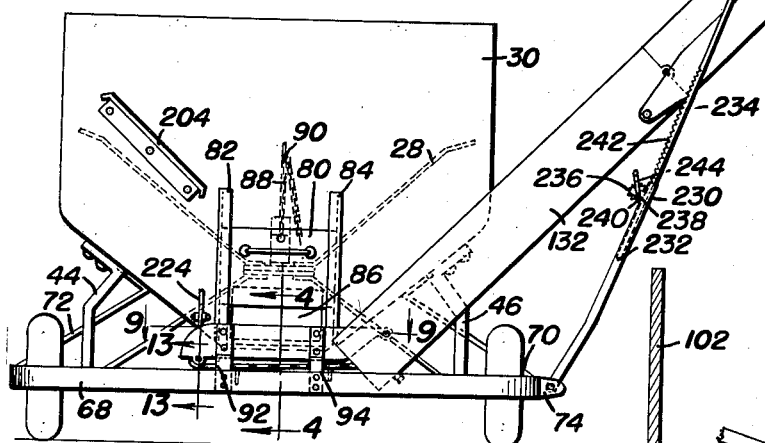
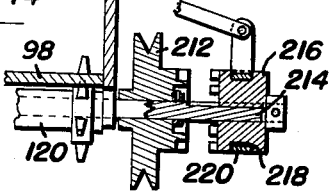
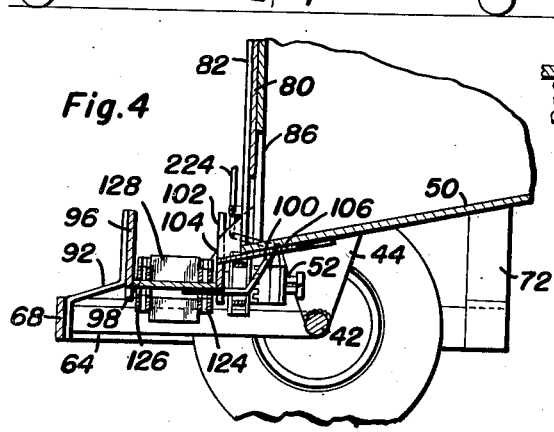
Raymond D. Filsinger
Dean L. Filsinger
INVENTORS.

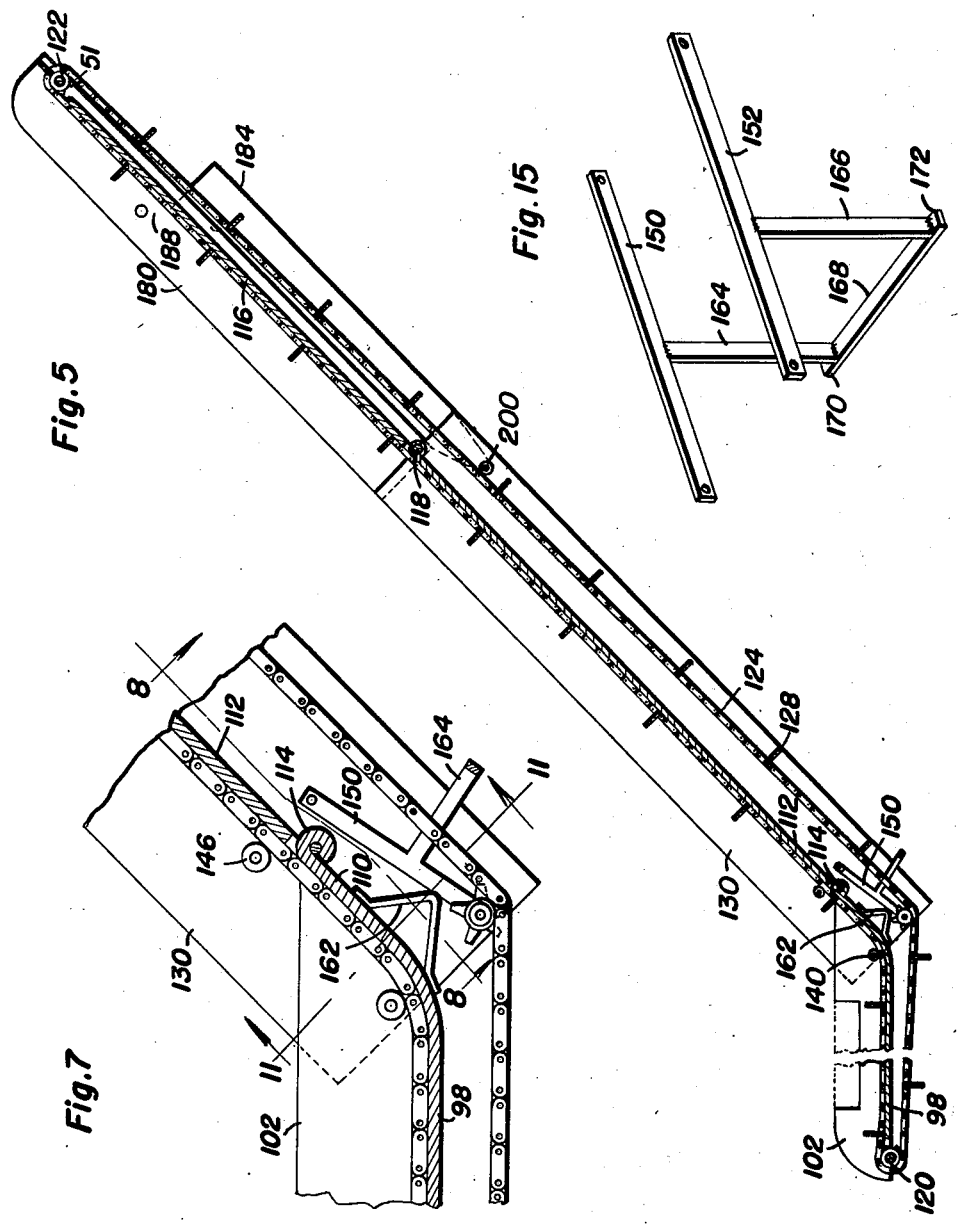

Oct. 20, 1953  R. D. FILSINGER ET AL  2,656,034
VEHICLE HAULING ELEVATOR
Filed Jan. 14, 1952  4 Sheets-Sheet 4
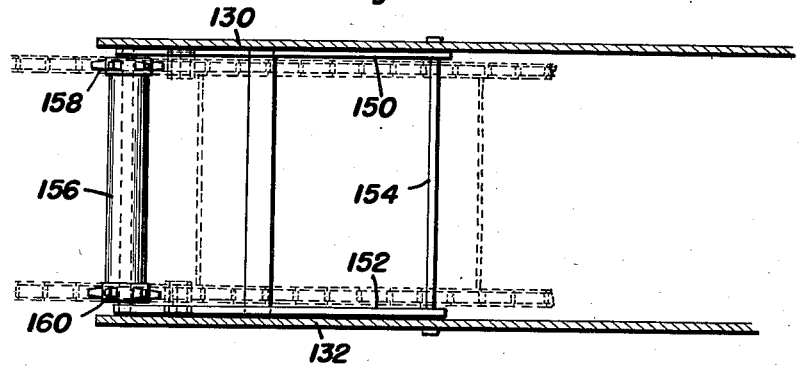
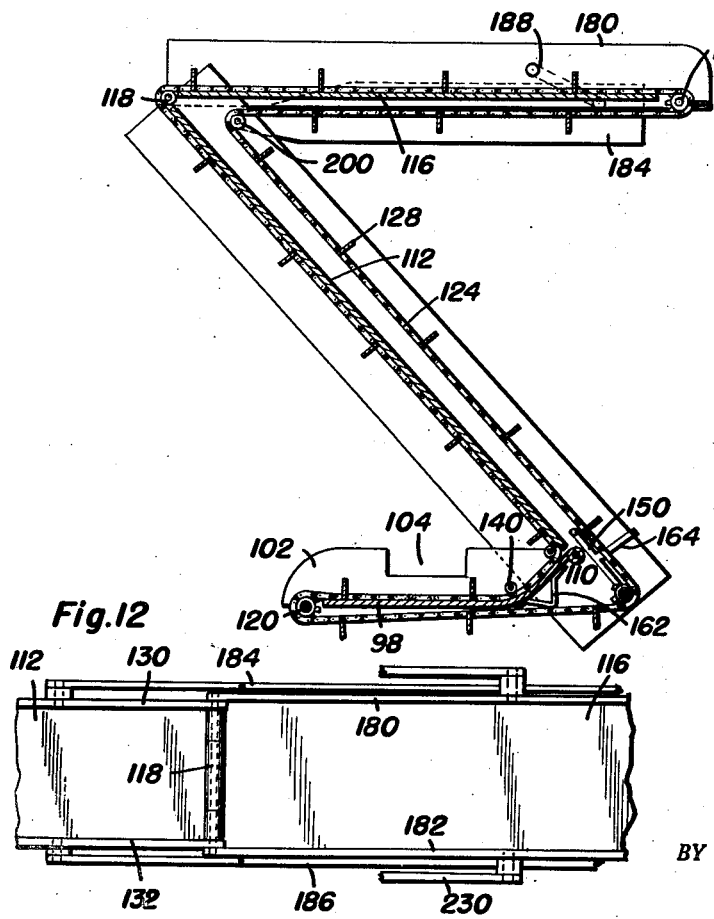
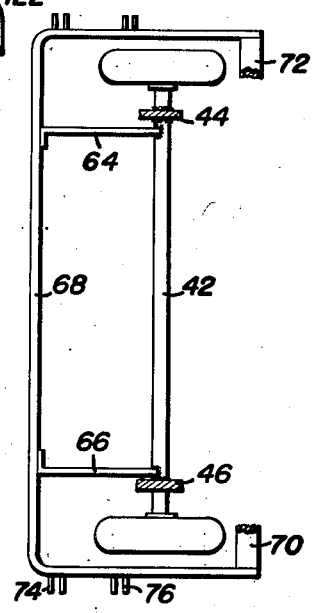
Raymond D. Filsinger
Dean L. Filsinger
INVENTORS.

Patented Oct. 20, 1953

2,656,034

UNITED STATES PATENT OFFICE 2,656,034

VEHICLE HAULING ELEVATOR

Raymond D. Filsinger and Dean L. Filsinger, Clearwater, Nebr.

Application January 14, 1952, Serial No. 266,338

5 Claims. (Cl. 198—115)

1

This invention relates to a folding elevator and particularly to an elevator to be mounted on the rear end of a tractor or other vehicle for delivering material from the vehicle to another container.

In the hauling and handling of farm produce particularly grain and the like it is very desirable to have means for transferring the produce from the field wagons to bins, freight cars or other containers. The present invention provides an elevator to be mounted on a field truck or any type of vehicle and having means to drive the same from the take-off such as the power take-off of a hauling tractor and to operate the elevator to deliver material from the tractor to any other suitable container.

The apparatus according to this invention comprises a platform which can be mounted on the rear end of a vehicle and onto which the produce can be deposited. A chute extends upwardly from the platform and has an endless conveyor mounted thereon so that any material deposited on the platform will be carried up and deposited at the top of the chute. In order to make the device portable a chute has been arranged to be folded with respect to the rest of the elevator and means are provided to take up the slack in the conveyor produced by the chute so that the same may be folded or unfolded without the necessity of taking off the elevator and it will be in condition for use at all times.

It is accordingly an object of this invention to provide an improved folding elevator.

It is a further object of this invention to provide an elevator for attachment to a vehicle.

It is a further object of this invention to provide a folding elevator with means for maintaining a conveyor portion tight at all times.

It is a further object of this invention to provide means for automatically maintaining the tension on the conveyor of an elevator.

It is a further object of this invention to provide a vehicle mounted elevator which can be driven by a power take-off.

Other objects and many of the attendant advantages of this invention will be apparent from the following detailed description taken in conjunction with the accompanying drawings, in which:

Figure 1 is a side elevation of the tractor drawn grain truck with the elevator attached in the carrying position;

Fig. 2 is a rear elevation of the truck of Figure 1 with the elevator in carrying position;

2

Figure 3 is a rear view showing the elevator in operating position;

Figure 4 is an enlarged vertical section taken substantially on the plane indicated by the line 4—4 of Figure 3 and showing the connection of the elevator to the vehicle;

Figure 5 is an enlarged longitudinal section through the elevator in operating position;

Figure 6 is a view similar to Figure 5 but showing the elevator in carrying position;

Figure 7 is an enlarged detail sectional view of the slack eliminator;

Figure 8 is an enlarged detail sectional view taken substantially on the plane indicated by the line 8—8 of Figure 7 and showing the construction of the slack eliminator;

Figure 9 is a horizontal section taken substantially on the plane indicated by the line 9—9 of Figure 3 and showing the driving mechanism for the elevator;

Figure 10 is an enlarged section taken substantially on the plane indicated by the line 10—10 of Figure 2 and showing the carrying hook for supporting the folded elevator on the truck;

Figure 11 is an enlarged cross-section showing the slack eliminator taken substantially on the plane indicated by the line 11—11 of Figure 7;

Figure 12 is an enlarged fragmentary plan view of a portion of the conveyor;

Figure 13 is an enlarged longitudinal section through the driving clutch taken substantially on the plane indicated by the line 13—13 of Figure 3;

Figure 14 is an enlarged perspective of the slack control fulcrum;

Figure 15 is an enlarged perspective view of the slack control tines; and

Figure 16 is a horizontal section showing the support for the elevator.

In the exemplary embodiment of the invention a tractor 10 is provided with a drawbar 12 and a power take-off 14. The hitch 16 of a truck 18 is connected to the drawbar 12 and to the front axle 20 of the truck 18. The front axle 20 is supported on ground wheels 22 and is provided with a skein 24 on which is mounted a fifth wheel 26. A bolster 28 is mounted on the fifth wheel 26 and carries a truck body 30. A bearing sleeve 32 is rigidly mounted in the bolster 28 and has a shaft 34 journaled therein. A telescoping drive shaft 36 is connected between the shaft 34 and the power take-off 14 by means of universal joints 38 and 40. The rear end of the truck body 30 is mounted on an axle 42 by means of standards 44 and 46. The truck body 30 is preferably constructed of considerably greater depth at the rear than the front so that it has a sloping bottom 50.

A stub shaft 52 is journaled on a bracket 54 mounted on the rear of the body 30 and has a driving connection to the shaft 34 by means of a telescoping shaft 56, the telescoping shaft 56 being connected between the stub shaft 52 and the shaft 34 by means of universal joints 58 and 60. A V-groove pulley 62 is mounted on the stub shaft 52. Rearwardly extending arms 64 and 66 are mounted on the rear axle 42 and form a support for rear bumper-like member 68 which extends across the rear of the vehicle and embraces the rear wheels thereof. The forward end of the member 68 is rigidly attached to the truck body 30 by means of braces 70 and 72. Brace supporting brackets 74 and 76 are mounted on the member 68 for a purpose presently to be described.

Truck body 30 is provided with a rear door 80 which slides in vertical tracks 82 and 84 to uncover a rear door 86 through which the contents of the body 30 may be discharged for any suitable reason. A suitable support such as a chain 88 may be connected to any suitable fastener such as a hook 90 for maintaining the door 80 in adjusted relation over the door opening 86.

Brackets 92 and 94 are connected to the rear side boards 96 of an elevator platform 98. The platform 98 is connected to the bottom 50 of the truck body 30 by means of brackets 100. Front side board 102 of the platform 98 is provided with a cut out opening 104 through which extends an extension 106 of the bottom 50 so that any produce delivered through the opening 86 will be delivered onto the platform 98.

The platform 98 is provided at one end thereof with an upwardly directed end portion 110. A chute 112 is pivotally connected to the end 110 by means of a hinge 114. The top end 116 of the chute 112 is hingedly connected adjacent the central portion thereof by means of a hinge 118.

A sprocket shaft 120 is mounted at the free end of the platform 98 and a sprocket shaft 122 is mounted at the free end of the chute 116. An endless conveyor including chains 124 and 126 are mounted in parallel longitudinal relation on the platform 98 and the attached chute. Elevator members 128 are secured between the chains 124 and 126 in spaced relation to move the produce over the platform 98 and up the chute members 112 and 116.

Side boards 130 and 132 are mounted on the chute section 112 and extend downwardly over the upturned ends of the platform 98 being mounted outside of the side boards 96 and 102. A stub roller 136 is mounted on a shaft 138 which is secured in the rear board 96 at the junction of the horizontal platform 98 and the upturned end 110. Likewise the roller 140 is mounted on a stub shaft 142 which is mounted on the front side board 102, likewise at the junction of the platform 98 and the upturned end 110. The rollers 136 and 140 overlie the chains 124 and 126 so that the conveyor is held tightly against the surface of the platform and the upturned end so that it cannot raise away therefrom.

Rollers 144 and 146 mounted in the side boards 132 and 130 immediately above the chains 114 so that when the sections 112 pivots about the hinge 114 the conveyor chains are maintained in proximity to the surface of the chute section 112.

A conveyor tension control includes a pair of arms 150 and 152 mounted on a shaft 154 which is mounted between the side boards 130 and 132 at a point above the hinge 114. The arms 150 and 152 extend longitudinally along the sides 130 and 132 to a point below the platform 98 where it is provided with a cross roller 156 carrying sprocket wheels 158 and 160 to contact the chains 124 and 126 of the conveyor for the purpose of keeping the tension of the conveyor substantially firm. The arms 150 and 152 engage fulcrums 162 which are substantially triangular members secured to the bottom side of the extension 110 and extend into the path of the arms 150 and 152 so that by normal adjustment of the operating position of the chute 112 the arms will be biased by the fulcrums 162 and swing in an arc to maintain the tension on the conveyor.

The V-shaped fulcrums 162 are operative to take up the slack for small angular motion of the chute 112, that is substantially unavailable to take up the slack when the chute is folded with respect to the platform 98. Arms 164 and 166 are mounted on the arms 150 and 152 and have their cross bar 168 which extends beyond the arms 164 and 166 to provide ears 172 for contacting of the bottom edge of the side boards 130 and 132 so that when the chute is folded the arms 150 and 152 are maintained in extended position so that the roller 156 will constantly maintain the tension of the conveyor.

The top section of the chute 116 is provided with side boards 180 and 182 which are relatively narrower than the side boards 130 and 132 and essentially extend a short distance below the chute bottom 116. Depending guide members 184 and 186 are suspended from the side members 180 and 182 respectively by means of arms 188 and 190. Guide members 184 and 186 are pivoted on the side members 130 and 132 at a point a material distance below the hinge 118 so that when the chute is folded the guide members will be joined at a point below the overlapping portion of the fold. Stub rollers 200 are provided on the side members 130 and 132 and underlie the chains 124 and 126 to maintain them in substantially constant spaced relation to the chute bottom 112 and 16 when the chute is folded.

The side board 184 is provided with a plurality of hooks 202 which engage the top of the rear of the truck body 30 to support the top plate of the elevator when in folded position. A bumper pad 204 is attached to the rear of the truck body to support the intermediate plate of the elevator conveyor when the same is in folded position.

The conveyor is driven by means of a power connection to the sprocket wheel 129 which includes a belt 210 mounted on the pulley 62 and pulley 212 on the extension shaft 214. Power is transmitted from the pulley 212 to the shaft 214 by means of a clutch 216 which is keyed to the shaft 213 so as to be non-rotative therewith. Clutch 216 is provided with a peripheral groove 218 in which is provided a control band 220 operated by a control lever 224.

During transportation of the vehicle with or without a load the conveyor will be folded against the pad 204 and the top plate supported by means of the hooks 202 so that the conveyor will need no more room than the body of the vehicle. When it is desired to unload the contents of the body 30 the chute is unfolded and held in unfolded relation by means of the braces 230 mounted on the brackets 74 and 76 and are pivotally connected to the side boards 180 and 182. The arms 230 are constructed of two telescoping parts the lower part 232 being pivoted on the brackets 74 and 76 while the upper parts 234 are pivoted on the side boards 180 and 182. The upper part 234 is telescopically received in the lower part 232. The outer part 232 carries a bracket 236 on which is mounted a shaft 238 carrying spur gears 240 in driving relation with rack 242 on the member 234. The shaft 238 is operated by crank 244 to control the overall length of the arms 230 to maintain the chute in any desired angular position.

The chute may be operated at any desired inclination from about 10° to 70°. The ends of the arms 150 pivoted to the chute swing about the hinge 114 by angular movement of the chute and pivot about the angular fulcrum 162 to control the slack in the chains 124 and 126.

The sections of the conveyor are of such length that when folded the entire conveyor is mounted within the cross section of the vehicle so that the conveyor may pass through any opening or space through which the vehicle can pass. This is particularly useful in operating in narrow alleys or in buildings. The vehicle is maneuvered into unloading position after which the chute is unfolded into operative position. By way of example and not of limitation an elevator having a platform three feet long and a chute having a bottom section six feet three inches long and a top section five feet seven and one-half inches long has been operated with complete satisfaction. To remove the load and deliver it by the conveyor power is delivered by the power take-off 14 through the various shafting to the pulley 212 and the power is transmitted to the roller 120 by closing the clutch 216 so that the conveyor is driven over the platform and the chute.

It will thus be seen that this invention provides an improved foldable conveyor which can be mounted on the rear of a vehicle and conveniently carried therewith. The folded elevator requires substantially no extra space on the vehicle so that it may operate anywhere the vehicle can go and may be used either in or out of a building so that any produce carried by the truck body 30 may be delivered in any suitable container wherever found.

For the purpose of exemplification a particular embodiment of the invention has been shown, and described according to the best present understanding thereof, however, it will be apparent to those skilled in the art, that many changes and modifications can be made therein without departing from the true spirit of the invention.

Having described the invention, what is claimed as new is:

1. A conveyor for mounting on a vehicle comprising a substantially horizontal platform, an upwardly directed end portion on said platform, a chute hingedly connected to said end, said chute being hinged intermediate the ends thereof, an endless conveyor entrained on said platform and said chute, driving means operatively connected to said conveyor, roller means mounted on said platform at the junction of said end portion, roller means mounted on said chute adjacent the connection with said end, said roller means overlying said conveyor, side boards on the intermediate section of said conveyor, said side boards enclosing said end portion on said platform, a pair of arms pivotally mounted on said side boards above the connection with said end portion, said arms extending below said platform, conveyor engaging rollers mounted on said arms, triangular fulcrums mounted on said end to control inward motion of said arms, ears on said arms adapted to engage the edge of said side boards.

2. A folding elevator assembly comprising a lower normally horizontal section, an upwardly directed end on said section, a chute hinged at the top of said end, said chute being hinged adjacent the central portion thereof, an endless chain conveyor mounted on said platform and said chute, sprocket wheels engaging the conveyor, means for driving the sprocket wheels at the end of the platform, rollers mounted on said platform and said chute for maintaining said conveyor in proximity to said platform and said chute, arms mounted on said chute above said upwardly directed end, said arms extending below said platform, a triangular fulcrum mounted on said end, pivotal motion of said chute about said end causing swinging motion of said arms about said fulcrum to maintain tension in said conveyor.

3. A folding elevator assembly comprising a lower normally horizontal section, an upwardly directed end on said section, a chute hinged at the top of said end, said chute being hinged adjacent the central portion thereof, an endless chain conveyor mounted on said platform and said chute, sprocket wheels engaging the conveyor, means for driving the sprocket wheels at the end of the platform, rollers mounted on said platform and said chute for maintaining said conveyor in proximity to said platform and said chute, arms mounted on said chute above said upwardly directed end, said arms extending below said platform, a triangular fulcrum mounted on said end, pivotal motion of said chute about said end causing swinging motion of said arms about said fulcrum to maintain tension in said conveyor, ears on said arms engaging said chute to take up the slack of said conveyor when said elevator is folded.

4. A conveyor for mounting on a vehicle comprising a substantially horizontal platform, an upwardly directed end portion on said platform, a chute hingedly connected to said end, said chute being hinged intermediate the ends thereof, an endless conveyor entrained on said platform and said chute, driving means operatively connected to said conveyor, roller means mounted on said platform at the junction of said end portion, roller means mounted on said chute adjacent the connection with said end, said roller means overlying said conveyor, side boards on the intermediate section of said conveyor, said side boards enclosing said end portion on said platform, a pair of arms pivotally mounted on said side boards above the connection with said end portion, said arms extending below said platform, conveyor engaging rollers mounted on said arms, triangular fulcrums mounted on said end to control inward motion of said arms, ears on said arms adapted to engage the edge of said side boards, the sections of said chute being so proportioned that when folded the entire structure is mounted within the cross sectional dimensions of the vehicle.

5. A folding elevator assembly comprising a lower normally horizontal section, an upwardly directed end on said section, a chute hinged at the top of said end, said chute being hinged adjacent the central portion thereof, an endless chain conveyor mounted on said platform and said chute, sprocket wheels engaging the conveyor, means for driving the sprocket wheels at the end of the platform, rollers mounted on said platform and said chute for maintaining said conveyor in proximity to said platform and said chute, arms mounted on said chute above said upwardly directed end, said arms extending below said platform, a triangular fulcrum mounted on said end, pivotal motion of said chute about said end causing swinging motion of said arms about said fulcrum to maintain tension in said conveyor, ears on said arms engaging said chute to take up the slack of said conveyor when said elevator is folded, telescoping brace arms pivotally secured to said vehicle and to the top section of said chute, means controlling the length of said brace arms to adjust the inclination of said chute.

RAYMOND D. FILSINGER.
DEAN L. FILSINGER.

References Cited in the file of this patent

UNITED STATES PATENTS

| Number | Name | Date |
|---|---|---|
| 981,894 | Spinney | Jan. 17, 1911 |
| 1,074,182 | Jorgenson | Sept. 30, 1913 |
| 1,090,670 | Zimmerman | Mar. 17, 1914 |
| 1,232,405 | Stark | July 3, 1917 |